United States Patent
Hung

(10) Patent No.: US 9,268,370 B2
(45) Date of Patent: Feb. 23, 2016

(54) LATCH STRUCTURE

(71) Applicant: GETAC TECHNOLOGY CORPORATION, Hsinchu County (TW)

(72) Inventor: Tsung-Liang Hung, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 186 days.

(21) Appl. No.: 14/069,265

(22) Filed: Oct. 31, 2013

(65) Prior Publication Data

US 2014/0313652 A1   Oct. 23, 2014

(30) Foreign Application Priority Data

Apr. 23, 2013  (CN) .......................... 2013 1 0141736

(51) Int. Cl.
   *E05C 19/06*   (2006.01)
   *G06F 1/16*    (2006.01)
   *E05C 19/00*   (2006.01)

(52) U.S. Cl.
   CPC .............. *G06F 1/1656* (2013.01); *E05C 19/06* (2013.01); *E05C 19/063* (2013.01); *E05C 19/066* (2013.01)

(58) Field of Classification Search
   CPC ...... E05C 19/06; E05C 19/063; E05C 19/066
   USPC ..................... 292/1, 80, 81, 87, 91, DIG. 71
   See application file for complete search history.

(56) References Cited

U.S. PATENT DOCUMENTS

| | | | | | |
|---|---|---|---|---|---|
| 305,385   | A  | * | 9/1884  | Gubsel ............................. | 292/19 |
| 545,778   | A  | * | 9/1895  | Cough ............................. | 292/87 |
| 634,332   | A  | * | 10/1899 | Gardner .......................... | 292/85 |
| 2,565,636 | A  | * | 8/1951  | Tinnerman ...................... | 292/76 |
| 3,596,953 | A  | * | 8/1971  | Gastaldi ......................... | 292/87 |
| 4,344,646 | A  | * | 8/1982  | Michel ............................ | 292/87 |
| 5,253,142 | A  | * | 10/1993 | Weng ........................ | 361/679.56 |
| 5,348,356 | A  | * | 9/1994  | Moulton .......................... | 292/80 |
| 5,931,514 | A  | * | 8/1999  | Chung ............................. | 292/89 |
| 6,556,432 | B2 | * | 4/2003  | Chen et al. ................ | 361/679.33 |
| 7,681,755 | B2 | * | 3/2010  | Roesler ........................ | 220/788 |
| 8,434,251 | B2 | * | 5/2013  | Lee et al. ........................ | 40/780 |

(Continued)

FOREIGN PATENT DOCUMENTS

| | | | |
|---|---|---|---|
| DE | 29605059 U1 | * | 5/1996 |
| EP | 2099271 A2  |   | 9/2009 |
| FR | 1465897     | * | 1/1967 |

OTHER PUBLICATIONS

European Patent Office, Search Report, Patent Application Serial No. 13190797.4, Aug. 25, 2015, Europe.

*Primary Examiner* — Carlos Lugo

(57) ABSTRACT

A latch structure is adapted for covering a socket of an electronic apparatus. The latch structure includes a body and a slider. The body includes a covering portion and a fixing portion, and the covering portion includes at least one first sliding part. The fixing portion is flexibly connected to the covering portion and is fixed to the electronic apparatus. The slider is detachably assembled to the body. The slider includes at least one second sliding part, and the second sliding part corresponds to the first sliding part. When the covering portion is bent relative to the fixing portion and covers the socket, the slider is capable of moving relative to the covering portion to a fixed location, so that the location where the covering portion covers the socket is fixed.

20 Claims, 7 Drawing Sheets

(56) References Cited

U.S. PATENT DOCUMENTS

| | | | |
|---|---|---|---|
| 8,579,336 B2* | 11/2013 | Hsiung | 292/1 |
| 2006/0133023 A1* | 6/2006 | Chen et al. | 361/683 |
| 2008/0291641 A1 | 11/2008 | Sheng | |
| 2010/0001538 A1* | 1/2010 | Kim et al. | 292/137 |
| 2011/0211300 A1 | 9/2011 | Mori et al. | |

* cited by examiner

LATCH STRUCTURE

BACKGROUND OF THE INVENTION

1. Field of the Invention

The invention relates to a latch structure, and more particularly to a latch structure equipped with a slider.

2. Description of Related Art

The continuous research and innovation of computer-related technologies contribute to the persistent progress in the development of notebook computers as well as peripherals of notebook computers. In addition, the notebook computers have been applied to a great extent, e.g., for personal use, industrial use, and even military use. Hence, various inventions pertinent to notebook computers have been developed in response to the diversity of the applications of the notebook computers. For instance, the military notebook computers are required to be waterproof for all-weather use. Besides, when a user inadvertently spills water over a normal notebook computer, the water may permeate into the notebook computer through external sockets and damage the internal circuits; thereby, the notebook computer may malfunction.

To prevent moisture or foreign objects from entering the notebook computer through the external sockets, the waterproof structure of the notebook computer often includes latch structures to cover the external sockets, and these latch structures are often assembled to the sockets by way of interference. However, such assembly often appears to have unfavorable reliability. For instance, in case that a notebook computer falls down, the latch structures therein are apt to fall off from the computer. If a fixing structure (e.g., a locking member) is employed to secure the latch structures, the reliability of the notebook computer may be improved, whereas the assembly difficulty and the manufacturing costs may be correspondingly increased.

SUMMARY OF THE INVENTION

The invention is directed to a latch structure which is capable of covering a socket of an electronic apparatus through relative movement of a slider and a body.

In an embodiment of the invention, a latch structure that is adapted for covering a socket of an electronic apparatus is provided. The latch structure includes a body and a slider. The body includes a covering portion and a fixing portion, and the covering portion includes at least one first sliding part. The fixing portion is flexibly connected to the covering portion and is fixed to the electronic apparatus. The slider is detachably assembled to the body. The slider includes at least one second sliding part that is arranged corresponding to the first sliding part. When the covering portion is bent relative to the fixing portion and covers the socket, the slider is capable of moving relative to the covering portion to a fixed location through a movement of the second sliding part relative to the first sliding part, and the slider fixes a location where the covering portion covers the socket.

According to an embodiment of the invention, rigidity of the slider is greater than rigidity of the body.

According to an embodiment of the invention, when the covering portion covers the socket, the covering portion seals the socket to prevent moisture from entering the electronic apparatus.

According to an embodiment of the invention, the first sliding part is a protruding bar, and the second sliding part is a sliding slot.

According to an embodiment of the invention, the first sliding part is a sliding slot, and the second sliding part is a protruding bar.

According to an embodiment of the invention, the body further includes a bent portion through which the fixing portion is flexibly connected to the covering portion. If the bent portion is subject to a force, the bent portion is distorted, such that the covering portion covers the socket.

According to an embodiment of the invention, the slider further includes at least one first latching hook, and the covering portion further includes at least one first recess. When the covering portion is bent relative to the fixing portion by the bent portion and covers the socket, the slider moves relative to the covering portion to the fixed location, and the first latching hook is locked to the first recess, so as to fix the slider to the fixed location.

According to an embodiment of the invention, the covering portion further includes at least one second recess. When the first latching hook is locked to the second recess, the slider is fixed to an initial location, such that the covering portion is bent relative to the fixing portion by the bent portion and covers the socket or uncovers the socket.

According to an embodiment of the invention, the slider further includes at least one first recess, and the covering portion further includes at least one first latching hook. When the covering portion is bent relative to the fixing portion by the bent portion and covers the socket, the slider moves relative to the covering portion to the fixed location, and the first latching hook is locked to the first recess, so as to fix the slider to the fixed location.

According to an embodiment of the invention, the slider further includes at least one opening, and the covering portion further includes at least one second latching hook. When the slider moves relative to the covering portion, the second latching hook is suitable for moving within the opening, and when the slider moves to the fixed location, the slider is locked to a stopper of the opening.

According to an embodiment of the invention, the slider further includes at least one second latching hook, and the covering portion further includes at least one opening. When the slider moves relative to the covering portion, the second latching hook is suitable for moving within the opening, and when the slider moves to the fixed location, the slider is locked to a stopper of the opening.

According to an embodiment of the invention, the slider further includes at least one first positioning portion, and the electronic apparatus further includes at least one second positioning portion. When the covering portion covers the socket, and the slider moves to the fixed location, the first positioning portion and the second positioning portion interfere with each other, so as to fix the location where the covering portion covers the socket.

According to an embodiment of the invention, a surface of the covering portion facing the electronic apparatus has a slot, and reinforcing ribs are arranged within the slot and surround the inner side surface of the slot.

According to an embodiment of the invention, the slider further includes a lever.

As discussed above, in the latch structure described herein, the body is fixed to the electronic apparatus by means of the fixing portion, and the slider is detachably assembled to the covering portion of the body. When the covering portion of the body is bent relative to the fixing portion and covers the socket of the electronic apparatus, the slider is capable of moving relative to the covering portion of the body to a fixed location, such that the location where the covering portion covers the socket is fixed, and the fixed covering portion can cover the socket. Since the slider of the latch structure serves to fix the covering portion, the latch structure does not fall off from the electronic apparatus even though the latch structure may be subject to a force. Moreover, the latch structure does not require any additional fixing structure, which simplifies the assembly process and lowers down the production costs.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
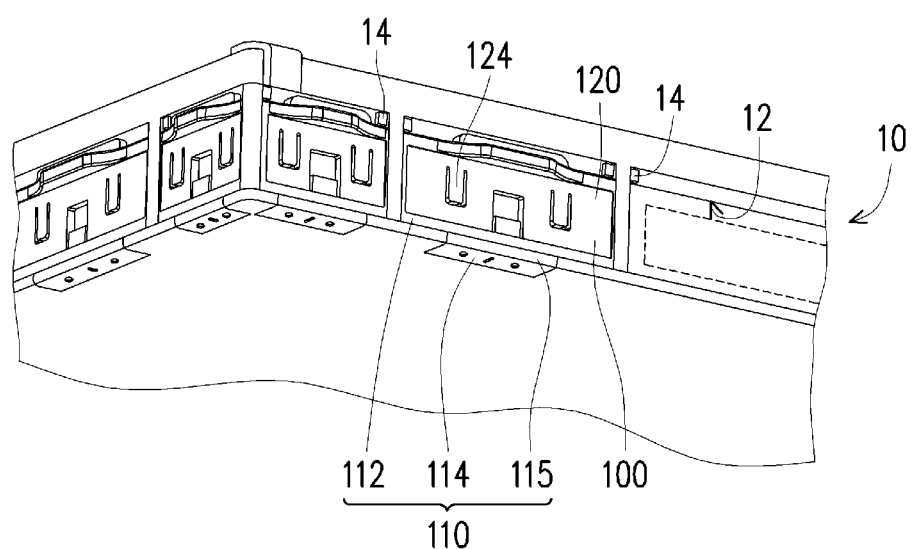
FIG. 1 is a schematic view illustrating an electronic apparatus according to an embodiment of the invention.
Figure 2:
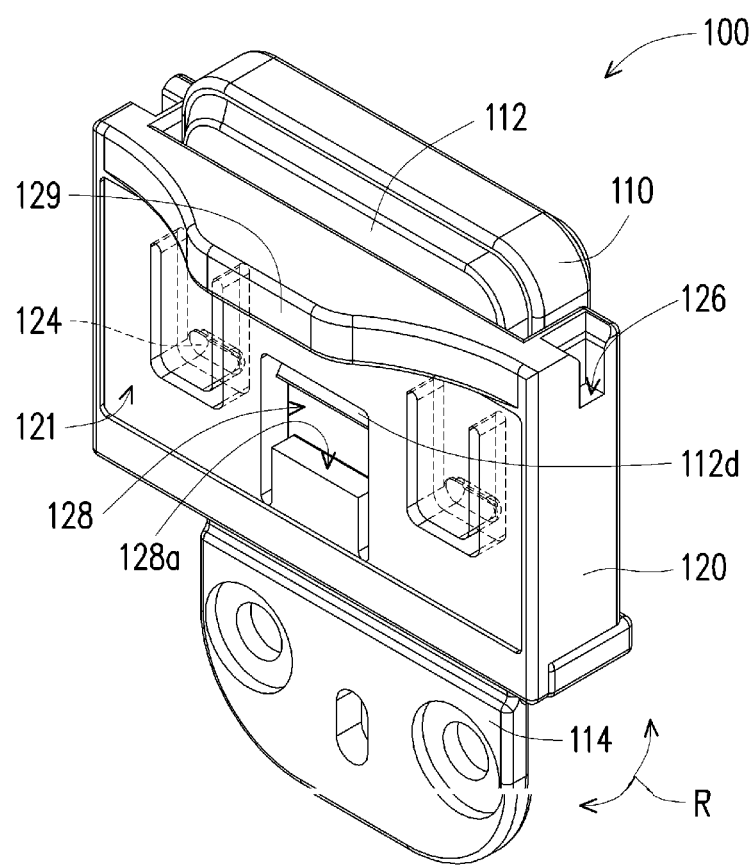
FIG. 2 is a schematic view illustrating that the slider of the latch structure of FIG. 1 is located at an initial position.
Figure 3:
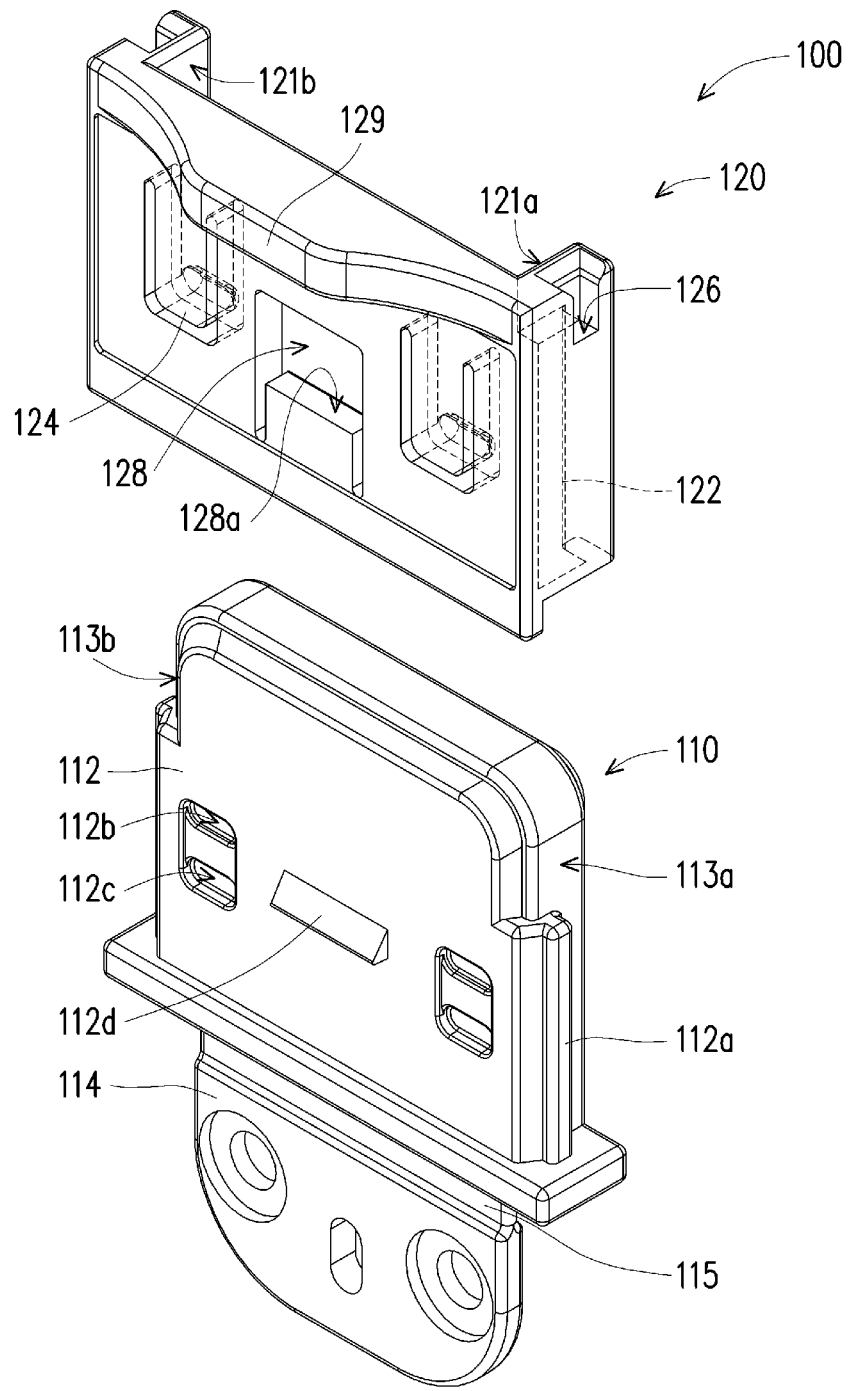
FIG. 3 is a schematic view illustrating the body and the slider of FIG. 2 before assembly.

FIG. 1 is a schematic view illustrating an electronic apparatus according to an embodiment of the invention. FIG. 2 is a schematic view illustrating that the slider of the latch structure of FIG. 1 is located at an initial position. FIG. 3 is a schematic view illustrating the body and the slider of FIG. 2 before assembly. With reference to FIG. 1 to FIG. 3, the latch structure 100 described in the present embodiment is adapted for covering a socket 12 of an electronic apparatus 10. The latch structure 100 includes a body 110 and a slider 120. The body 110 includes a covering portion 112 and a fixing portion 114, and the covering portion 112 includes at least one first sliding part 112a. The fixing portion 114 is flexibly connected to the covering portion 112 and is fixed to the electronic apparatus 10. The slider 120 is detachably assembled to the body 110. Here, the slider 120 includes at least one second sliding part 122 that is arranged corresponding to the first sliding part 112a.

Figure 4:
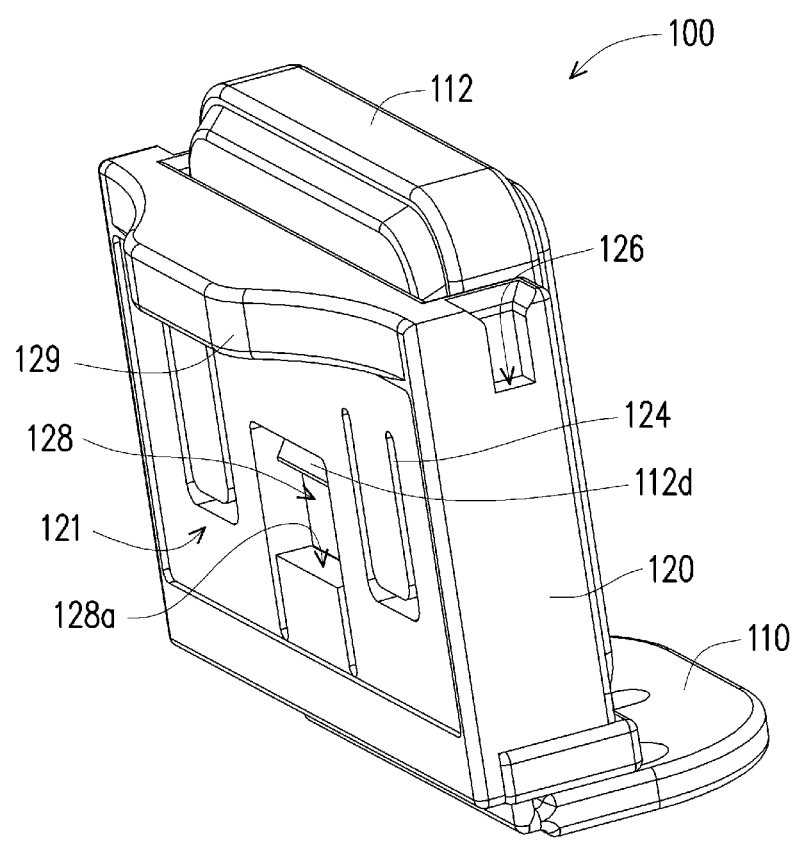
FIG. 4 is a schematic view illustrating that the fixing structure of FIG. 2 is bent relative to the covering portion.
Figure 5:
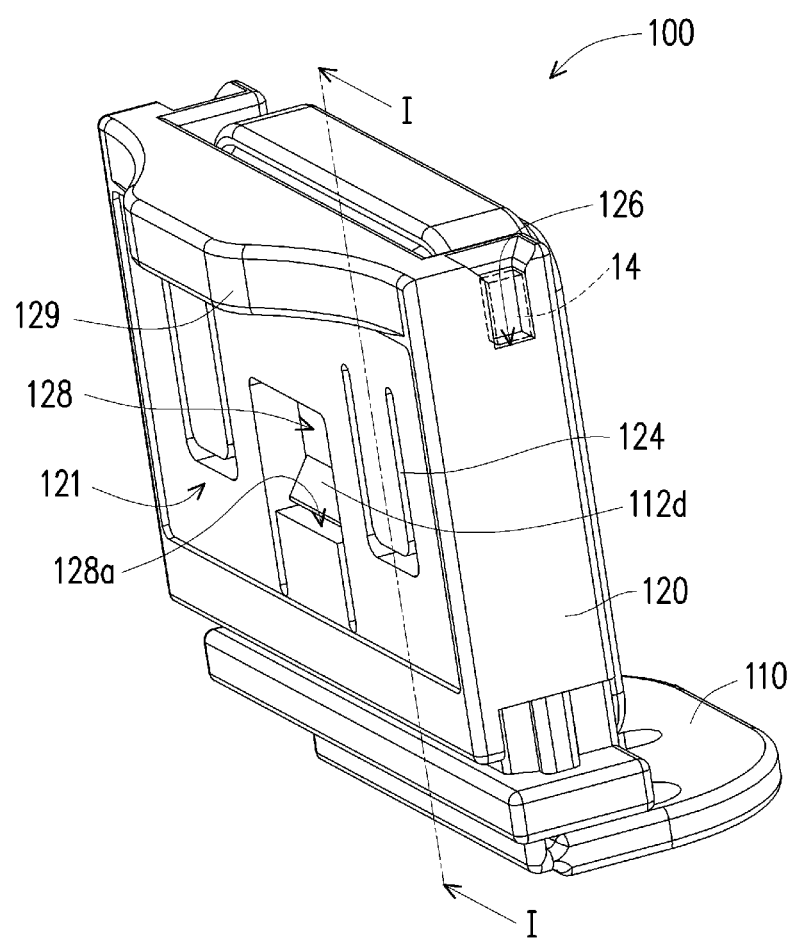
FIG. 5 is a schematic view illustrating that the slider of FIG. 4 is located at a fixed location.

FIG. 4 is a schematic view illustrating that the fixing structure of FIG. 2 is bent relative to the covering portion. FIG. 5 is a schematic view illustrating that the slider of FIG. 4 is located at a fixed location. Please refer to FIG. 1, FIG. 3, FIG. 4, and FIG. 5. In the present embodiment, the body 110 is assembled to the electronic apparatus 10 by means of the fixing portion 114, and the covering portion 112 is able to rotate relative to the fixing portion 114 in a rotating direction R (shown in FIG. 2). When the covering portion 112 is bent relative to the fixing portion 114 and then covers the socket 12, the slider 120 moves relative to the first sliding part 112a by the second sliding part 122, and thereby the slider 120 moves relative to the covering portion 112 to a fixed location (from the location shown in FIG. 4 to the location shown in FIG. 5), and the slider 120 fixes the location of the covering portion 112 when the covering portion 112 covers the socket 12.

In the present embodiment, the electronic apparatus 10 is, for instance, a notebook computer, and the socket 12 is, for instance, an external socket of the notebook computer. Here the external socket may refer to a memory slot or a USB port of a notebook computer, for instance. The latch structure 100 is fixed to the electronic apparatus 10 by means of the fixing portion 114 of the body 110, and the fixing portion 114 is locked to the electronic apparatus 10 by means of a locking member, for instance. Besides, the body 110 further includes a bent portion 115, and the fixing portion 114 is flexibly connected to the covering portion 112 by means of the bent portion 115. The bent portion 115 may be subject to a force and may then be distorted, such that the covering portion 112 covers the socket 12. The slider 120 is detachably assembled to the covering portion 112 of the body 110 in a sliding manner, for instance. When a force is exerted on the bent portion 115 of the body 110, the covering portion 112 is bent relative to the fixing portion 114 and covers the socket 12 of the electronic apparatus 10; at this time, the slider 120 is capable of moving relative to the covering portion 112 to a fixed location, so as to fix the covering portion 112 and cover the socket 12. Since the slider 120 of the latch structure 100 described herein serves to fix the covering portion 112, the latch structure 100 does not fall off from the electronic apparatus 10 even though the latch structure 100 may be subject to a force. Moreover, the latch structure 100 do not to be fixed by any additional fixing structure nor assembled by certain structures, which further simplifies the entire assembly process and lowers down the production costs.

According to the present embodiment, the slider 120 encases the body 110, and the body 110 and the slider 120 may be made of different materials, so as to simultaneously enhance structural rigidity and seal the socket 12 to prevent entry of moisture. For instance, the slider 120 may be wrapped by polycarbonate (PC), and the body 110 may be made of polypropylene (PP). As to the properties of the materials, PP is more flexible than PC, while the rigidity of PC is superior to that of PP. That is, the body 110 is made of PP with flexibility, so as to improve the flexibility of the body 110; thereby, the bent portion 115 of the body 110 may be bent relative to the fixing portion 114, and the covering portion 112 can then cover the socket 12. Besides, when the covering portion 112 covers the socket 12, due to the properties of the material of the body 110, the covering portion 112 is able to seal the socket 12, so as to prevent moisture from entering the electronic apparatus 10.

By contrast, the slider 120 that encases the covering portion 112 of the body 110 is made of PC with rigidity to improve the strength of the slider 120; thereby, the reliability of the slider 120 may be enhanced, and the covering portion 112 may be protected from being distorted by external forces. Besides, if the slider 120 is made of PC, the thickness of the resultant slider 120 may be reduced. To be specific, the rigidity of PC is superior to that of PP; hence, given the same requirement for rigidity, the required thickness of PC is less than the required thickness of PP. Hence, the slider 120 made of the material with high rigidity is conducive to the reduction of the thickness of the latch structure 100 and the miniaturization of the electronic apparatus 10. Note that the materials of the body 110 and the slider 120 are not limited to those described herein.

With reference to FIG. 3, in the present embodiment, the covering portion 112 includes at least one first sliding part 112a (as a matter of fact, there are two first sliding parts 112a in the present embodiment, while only one of them is depicted and marked in FIG. 3 because of the limited angle of observation), and the slider 120 includes at least one second sliding part 122 (two of which are shown in FIG. 3). Through the movement of the second sliding parts 122 relative to the first sliding parts 112a, the slider 120 is able to move relative to the covering portion 112 to a fixed location. For instance, each of the first sliding parts 112a is a protruding bar, and the protruding bars are located at the surfaces 113a and 113b at two respective sides of the covering portion 112. The slider 120 encases the covering portion 112, and the second sliding parts 122 are sliding slots corresponding to the protruding bars. When the covering portion 112 is capable of being bent relative to the fixing portion 114 to cover the socket 12, the slider 120 moves to the fixed location along an extending direction of the sliding slots through the relative movement of the sliding slots and the protruding bars, so as to fix the covering portion 112. However, the first sliding parts 112a include but not be limited to the protruding bars, and the second sliding parts 122 include but not be limited to the sliding slots. In another embodiment not shown, the first sliding parts may be sliding slots, and the second sliding parts may correspondingly be protruding bars.

Figure 6:
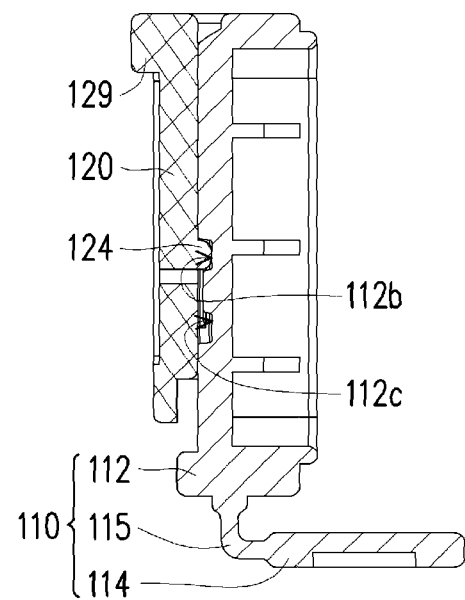
FIG. 6 is a cross-sectional view illustrating the latch structure of FIG. 5 along a line I-I.

FIG. 6 is a cross-sectional view illustrating the latch structure of FIG. 5 along a line I-I. With reference to FIG. 3, FIG. 4, FIG. 5, and FIG. 6, to clearly illustrate the relation of the slider 120 and the covering portion 112, parts of the slider 120 shown in FIG. 3 are depicted by broken lines. In the present embodiment, the slider 120 may be fixed to the location shown in FIG. 5 by means of a positioning structure. For instance, the slider 120 further includes at least one first latching hook 124 (two of which are shown in the drawings); the covering portion 112 further includes at least one first recess 112b (two of which are shown in the drawings). When the covering portion 112 is bent relative to the fixing portion 114 by the bent portion 115 and covers the socket 12 (as shown in FIG. 1), the slider 120 moves from the initial location shown in FIG. 4 to the fixed location shown in FIG. 5, such that the first latching hooks 124 are locked to the first recesses 112b, so as to fix the slider 120 to the fixed location. Besides, in the present embodiment, the covering portion 112 further includes at least one second recess 112c (two of which are shown in the drawings). When the first latching hooks 124 are locked to the second recesses 112c, the slider 120 is fixed to the initial location shown in FIG. 4. And the slider 120 doesn't protrude from the covering portion 110, such that the covering portion 112 may be bent relative to the fixing portion 114 and cover the socket 12. However, the arrangement of the positioning structure of the slider 120 is not limited to that described herein. In another embodiment not shown herein, the slider may include at least one first recess, and the covering portion may include at least one first latching hook, such that the slider 120 may be fixed to the fixed location or the initial location.

With reference to FIG. 1, FIG. 4, and FIG. 5, when the slider 120 moves from the initial location shown in FIG. 4 to the fixed location shown in FIG. 5, the slider 120 not only locks the first recess 112b (shown in FIG. 6) by means of the first latching hook 124 but also interferes with the electronic apparatus 10, such that the covering portion 112 seals the socket 12. In the present embodiment, the slider 120 further includes at least one first positioning portion 126 (two of which are shown in the drawings). The electronic apparatus 10 further includes at least one second positioning portion 14 (two of which are shown in the drawings). To illustrate the interference of the first and second positioning portions 126 and 14, the second positioning portions 14 in the slider 120 are depicted by dotted lines in FIG. 5. The first positioning portions 126 interfere with the second positioning portions 14, so as to fix the location of the covering portion 112 when the covering portion 112 covers the socket 12. For instance, the first positioning portions 126 may be slots arranged on two side surfaces 121a and 121b of the slider 120, and the second positioning portions 14 may be protrusions of the electronic apparatus 10 and may correspond to the slots. When the covering portion 112 covers the socket 12 and the slider 120 moves to the fixed location, the slots and the protrusions interfere with each other, so as to confine the movement of the covering portion 112 and seal the socket 12.

Besides, in the latch structure 100, the slider 120 further includes at least one opening 128, and the covering portion 112 further includes at least one second latching hook 112d. When the slider 120 moves relative to the covering portion 112, the second latching hook 112d is suitable for moving within the opening 128, and when the slider 120 moves to the fixed location, the slider 120 is locked to a stopper 128a of the opening 128. In particular, according to the present embodiment, the opening 128 of the slider 120 is located between two first latching hooks 124, and the second latching hook 112d may move within the opening 128 in response to the movement of the covering portion 112 relative to the slider 120. When the slider 120 moves to the fixed location, the second latching hook 112d is locked to the stopper 128a of the opening 128, so as to prevent the slider 120 from continuously moving and falling off from the covering portion 112. However, the opening 126 described herein may or may not be located on the slider 120, and the second latching hook 112d described herein may or may not be located at the covering portion 112. In another embodiment of the invention, the second latching hook may be located on the slider, and the opening may be located at the covering portion.

Specifically, steps of assembling the latching structure 100 to the electronic apparatus 10 and covering the socket 12 are described below. The latch structure 100 is assembled to the electronic apparatus 10 by means of the fixing portion 114 of the body. The covering portion 112 is bent relative to the fixing portion 114, as shown in FIG. 4; at this time, the first latching hook 124 of the slider 120 is clipped to the second recess 112c of the covering portion 112, and the slider 120 is still located at the initial location. The slider 120 is then pushed to move relative to the covering portion 112 to the fixed location shown in FIG. 5.

Figure 7:
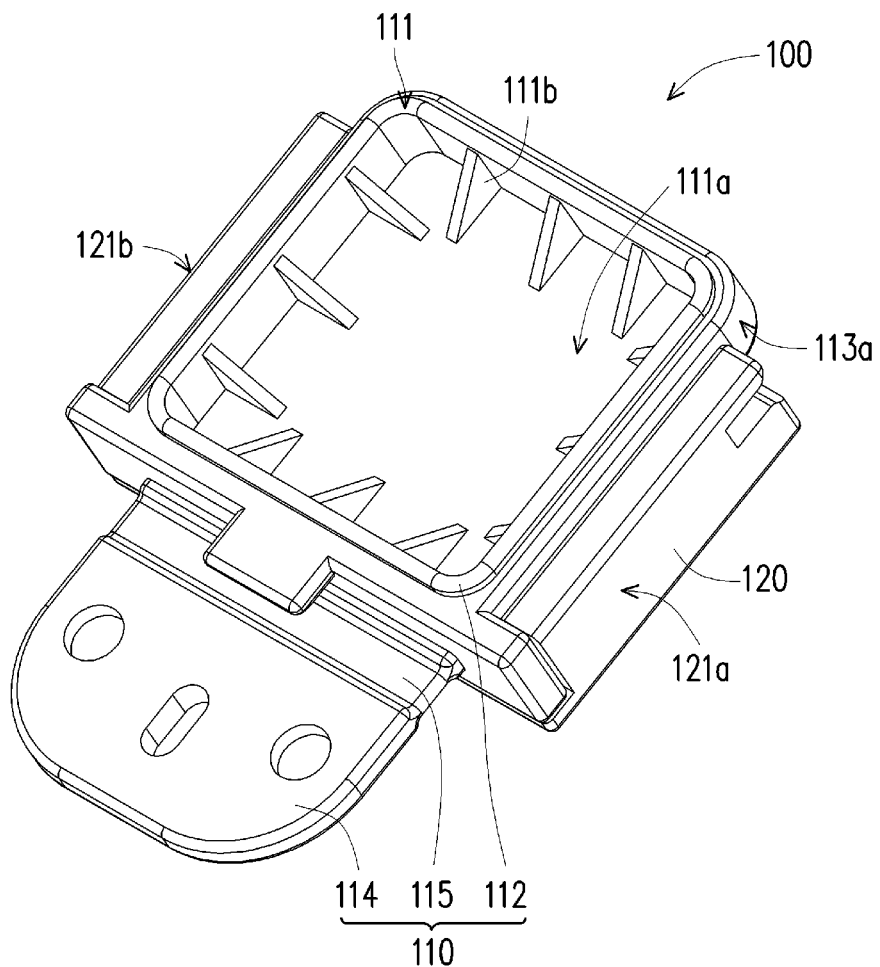
FIG. 7 is a schematic view illustrating the latch structure of FIG. 2 from another view angle.

When the slider 120 moves to the fixed location, the second latching hook 112d of the covering portion 112 is locked to the stopper 128a of the opening 128, so as to prevent the slider 120 from continuously moving and falling off from the covering portion 112. The first latching hook 124 of the slider 120 is locked to the first recess 112b of the covering portion 112, and the first positioning portion 126 of the slider 120 interferes with the second positioning portion 14 of the electronic apparatus 10, so as to fix the location where the covering portion 112 covers the socket 12; thereby, the covering portion 112 is able to seal the socket 12. FIG. 7 is a schematic view illustrating the latch structure of FIG. 2 from another view angle. In FIG. 7, a surface 111 of the covering portion 112 facing the electronic apparatus 10 has a slot 111a, and reinforcing ribs 111b are arranged within the slot 111a and surround the inner side surface of the slot 111a. The reinforcing ribs 111b are able to enhance the rigidity of the covering portion 112. Besides, a lever 129 is further formed on an outer surface 121 of the slider 120, and the lever 129 may act as a point of force application which allows a user to push the slider 120 to move back and forth between the fixed location and the initial location.

To sum up, in the latch structure described in an embodiment of the invention, the body is fixed to the electronic apparatus by means of the fixing portion, and the slider is detachably assembled to the covering portion of the body. When the covering portion of the body is bent relative to the fixing portion and covers the socket of the electronic apparatus, the slider is capable of moving relative to the covering portion of the body to a fixed position, such that the location where the covering portion covers the socket is fixed, and the fixed covering portion can cover the socket. Therefore, the latch structure does not require additional space for the purpose of fixing the covering portion, which simplifies the assembly process and lowers down the production costs. Moreover, the body and the slider may be made of different materials; thereby, the latch structure can be characterized with flexibility, so as to seal the socket and prevent entry of foreign objects, and the slider made of the highly rigid material not only ensures the favorable reliability of the slider but also allows the latch structure to have the reduced thickness.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A latch structure adapted for covering a socket of an electronic apparatus, the latch structure comprising:
   a body comprising:
      a covering portion comprising at least one first sliding part and at least one first fixing part;
      a fixing portion flexibly connected to the covering portion and fixed to the electronic apparatus; and
      a bent portion; and
   a slider detachably assembled to the body, the slider comprising at least one second sliding part and at least one second fixing part, the at least one second sliding part corresponding to the at least one first sliding part, wherein when the covering portion covers the socket, the slider moves relative to the covering portion to a fixed location wherein the at least one first fixing part is locked to the at least one second fixing part through a movement of the at least one second sliding part relative to the first sliding part, and a first positioning portion of the slider is fixed to a second positioning portion of the socket so as to fix a location of the covering portion to cover the socket;
   wherein the fixing portion is flexibly connected to the covering portion through the bent portion, and if the bent portion is subject to a force, the bent portion is distorted, such that the covering portion covers the socket.

2. The latch structure as recited in claim 1, wherein the rigidity of the slider is greater than the rigidity of the body.

3. The latch structure as recited in claim 1, wherein when the covering portion covers the socket, the covering portion seals the socket to prevent moisture from entering the electronic apparatus.

4. The latch structure as recited in claim 1, wherein the at least one first sliding part is a protruding bar, and the at least one second sliding part is a sliding slot.

5. The latch structure as recited in claim 1, wherein the at least one first sliding part is a sliding slot, and the at least one second sliding part is a protruding bar.

6. The latch structure as recited in claim 1, wherein the at least one first fixing part comprises a first recess, and the at least one second fixing part comprises a first latching hook, and when the covering portion is bent relative to the fixing portion by the bent portion and covers the socket, the slider moves relative to the covering portion to the fixed location, and the first latching hook is locked to the first recess, so as to fix the slider to the fixed location.

7. The latch structure as recited in claim 6, wherein the at least one first fixing part further comprises a second recess, and when the first latching hook is locked to the second recess, the slider is fixed to an initial location, such that the covering portion is bent relative to the fixing portion by the bent portion and covers the socket or uncovers the socket.

8. The latch structure as recited in claim 1, wherein the at least one first fixing part comprises a latching part, and the at least one second fixing part comprises a recess, and when the covering portion is bent relative to the fixing portion by the bent portion and covers the socket, the slider moves relative to the covering portion to the fixed location, and the latching hook is locked to the recess, so as to fix the slider to the fixed location.

9. The latch structure as recited in claim 1, wherein the at least one first fixing part comprises a latching portion, and the at least one second fixing part comprises an opening, when the slider moves relative to the covering portion, the latching hook is movable within the opening, and when the slider moves to the fixed location, the slider is locked to a stopper of the opening.

10. The latch structure as recited in claim 1, wherein the at least one first fixing part comprises an opening, and the at least one second fixing part comprises a latching hook, when the slider moves relative to the covering portion, the latching hook is movable within opening, and when the slider moves to the fixed location, the slider is locked to a stopper of the opening.

11. The latch structure as recited in claim 1, wherein a surface of the covering portion facing the electronic apparatus has a slot having a inner side surface and an inner wall, and plural reinforcing ribs are arranged within the slot and extending between the inner side surface and the inner wall of the slot.

12. The latch structure as recited in claim 1, wherein the slider further comprises a lever.

13. A latch structure adapted for covering a socket of an electronic apparatus, the latch structure comprising:
   a body comprising:
      a covering portion comprising at least one first sliding part and at least one first fixing part;
      a fixing portion flexibly connected to the covering portion and fixed to the electronic apparatus; and
      a bent portion; and
   a slider detachably assembled to the body, the slider comprising at least one second sliding part and at least one second fixing part, the at least one second sliding part corresponding to the at least one first sliding part, wherein when the covering portion covers the socket, the slider moves relative to the covering portion to a fixed location wherein the at least one first fixing part is locked to the at least one second fixing part through a movement of the at least one second sliding part relative to the first sliding part, and a first positioning portion of the slider is fixed to a second positioning portion of the socket so as to fix a location of the covering portion to cover the socket;
   wherein a surface of the covering portion facing the electronic apparatus has a slot having a inner side surface and an inner wall, and plural reinforcing ribs are arranged within the slot and extending between the inner side surface and the inner wall of the slot.

14. The latch structure as recited in claim 13, wherein the rigidity of the slider is greater than the rigidity of the body.

15. The latch structure as recited in claim 13, wherein when the covering portion covers the socket, the covering portion seals the socket to prevent moisture from entering the electronic apparatus.

16. The latch structure as recited in claim 13, wherein the at least one first sliding part is a protruding bar, and the at least one second sliding part is a sliding slot.

17. The latch structure as recited in claim 13, wherein the at least one first sliding part is a sliding slot, and the at least one second sliding part is a protruding bar.

18. The latch structure as recited in claim 13, wherein the at least one first fixing part comprises a latching portion, and the at least one second fixing part comprises an opening, when the slider moves relative to the covering portion, the latching hook is movable within the opening, and when the slider moves to the fixed location, the slider is locked to a stopper of the opening.

19. The latch structure as recited in claim 13, wherein the at least one first fixing part comprises an opening, and the at least one second fixing part comprises a latching hook, when the slider moves relative to the covering portion, the latching hook is movable within opening, and when the slider moves to the fixed location, the slider is locked to a stopper of the opening.

20. The latch structure as recited in claim 13, wherein the slider further comprises a lever.

\* \* \* \* \*